United States Patent
Miki et al.

(10) Patent No.: US 9,810,828 B2
(45) Date of Patent: Nov. 7, 2017

(54) LIQUID CRYSTAL DISPLAY DEVICE AND BACKLIGHT

(71) Applicant: Japan Display Inc., Tokyo (JP)

(72) Inventors: Hirohisa Miki, Tokyo (JP); Shigesumi Araki, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 15/276,862

(22) Filed: Sep. 27, 2016

(65) Prior Publication Data

US 2017/0146719 A1    May 25, 2017

(30) Foreign Application Priority Data

Nov. 19, 2015 (JP) ................. 2015-226324

(51) Int. Cl.
*F21V 8/00* (2006.01)
*G02F 1/1335* (2006.01)

(52) U.S. Cl.
CPC ......... *G02B 6/0026* (2013.01); *G02B 6/0001* (2013.01); *G02B 6/0003* (2013.01); *G02B 6/0031* (2013.01); *G02F 1/133615* (2013.01)

(58) Field of Classification Search
CPC .. G02B 6/0026; G02B 6/0031; G02B 6/0001; G02B 6/0011; G02B 6/0013; G02B 6/0015; G02B 6/0016; G02B 6/0018; G02B 6/002; G02B 6/0021; G02B 6/0023; G02B 6/0025; G02B 6/0028; G02B 6/0003; F21Y 2103/003; G01D 11/28; G02F 1/133615
See application file for complete search history.

(56) References Cited

U.S. PATENT DOCUMENTS

| | | | | |
|---|---|---|---|---|
| 8,718,437 | B2* | 5/2014 | Coe-Sullivan | G09F 13/22 385/129 |
| 2014/0160789 | A1* | 6/2014 | Park | G02B 6/0023 362/608 |
| 2015/0109814 | A1* | 4/2015 | Chen | G02B 6/0073 362/606 |
| 2015/0153508 | A1 | 6/2015 | Mihara et al. | |
| 2015/0285981 | A1* | 10/2015 | Park | G02B 6/0025 349/64 |
| 2017/0123120 | A1* | 5/2017 | Shirouchi | G02B 5/223 |

FOREIGN PATENT DOCUMENTS

| | | |
|---|---|---|
| JP | 2002-116440 A | 4/2002 |
| JP | 2006-84757 A | 3/2006 |
| JP | 2006-184347 A | 7/2006 |
| JP | 2014-137961 A | 7/2014 |
| JP | 2015-106487 A | 6/2015 |

* cited by examiner

*Primary Examiner* — Joseph L Williams
*Assistant Examiner* — Jose M Diaz
(74) *Attorney, Agent, or Firm* — Typha IP LLC

(57) ABSTRACT

A liquid crystal display device includes a liquid crystal display panel and a backlight. The backlight includes a light guide plate, an LED, and a wavelength converter between the light guide plate and the LED. The wavelength converter includes semiconductor quantum dots in a supporter, to which a reflection film is applied except surfaces that face the LED and the light guide plate.

10 Claims, 9 Drawing Sheets

LIQUID CRYSTAL DISPLAY DEVICE AND BACKLIGHT

CLAIM OF PRIORITY

The present application claims priority from Japanese Patent Application JP 2015-226324 filed on Nov. 19, 2015, the content of which is hereby incorporated by reference into this application.

BACKGROUND

The present invention relates to a display device, and more particularly, to a liquid crystal display device configured to use a backlight equipped with a wavelength converter having semiconductor quantum dots for improving light utilization efficiency.

The liquid crystal display device includes a TFT substrate having pixel electrodes and thin film transistors (TFT) formed in a matrix, a counter substrate which faces the TFT substrate, and a liquid crystal interposed between the TFT substrate and the counter substrate. An image is formed by controlling the luminous transmittance of liquid crystal molecules for each pixel.

The backlight is disposed on the back surface of the liquid crystal display panel since the liquid crystal by itself is unable to emit light rays. The LED (Light Emitting Diode) is employed as the light source for the backlight of the liquid crystal display device for the mobile phone. The LED is disposed on the side surface of the light guide plate, and various types of optical sheets are applied to the light guide plate. The backlight is constituted by storing the above-described optical components in the mold.

Generally, the LED emits the monochromatic light contrary to the requirement of the backlight for the liquid crystal display device to emit white light. Consequently, the LED for emitting UV light or blue light, and the optical converter for generating the light ray with longer wavelength have been employed to constitute the white light emitting structure.

Japanese Unexamined Patent Application Publication No. 2015-106487 discloses the wavelength converter disposed at the light emission side of the LED, which includes the dichroic mirror at the side that faces the LED so as to prevent the light with converted wavelength from returning to the LED for the purpose of preventing reflection of the light with the converted wavelength toward the LED.

Japanese Unexamined Patent Application Publications Nos. 2014-137961, 2002-116440, and 2006-84757 disclose the structure having the reflection sheet disposed behind the LED for the purpose of preventing the light emitted from the LED from leaking out of the back side of the LED serving as the light source. Japanese Unexamined Patent Application Publication No. 2006-184347 discloses the structure having the reflection sheet disposed behind the cold-cathode tube for the purpose of preventing the light from leaking out of the back side of the cold-cathode tube serving as the light source.

SUMMARY

As the method for generating white light by using the wavelength converter for the backlight having the LED as the light source, the semiconductor quantum dot has been used as the wavelength converter with excellent color expression property. The aforementioned method allows the converted wavelength of the light to be changed in accordance with the diameter of the semiconductor quantum dot (hereinafter referred to as quantum dot).

In this case, the wavelength converter is configured by sealing the quantum dot which has been dispersed in the resin within a supporter such as the glass. It is important to efficiently make incidence of the converted light on the light guide plate side from the wavelength converter. It is an object of the present invention to improve the light utilization efficiency of the backlight by using the wavelength converter having the quantum dot.

The present invention is intended to overcome the aforementioned problem by specific structures as described below.

(1) The present invention provides a liquid crystal display device which includes a liquid crystal display panel and a backlight. The backlight includes a light guide plate, an LED, and a wavelength converter between the light guide plate and the LED. The wavelength converter is configured to have a semiconductor quantum dot in a supporter. A reflection film is applied to the wavelength converter except surfaces that face the LED and the light guide plate.

(2) The present invention provides a liquid crystal display device which includes a liquid crystal display panel and a backlight. The backlight includes a light guide plate, an LED, and a wavelength converter between the light guide plate and the LED, and a reflection sheet is applied to lower sides of the light guide plate and the wavelength converter. The wavelength converter includes a semiconductor quantum dot in a supporter. The reflection sheet has an erected part which covers a surface of the wavelength converter, which does not face the LED at a side of the surface opposite to the one that faces the light guide plate.

DETAILED DESCRIPTION

The present invention will be described in detail in reference to the embodiments.

First Embodiment

Figure 1:
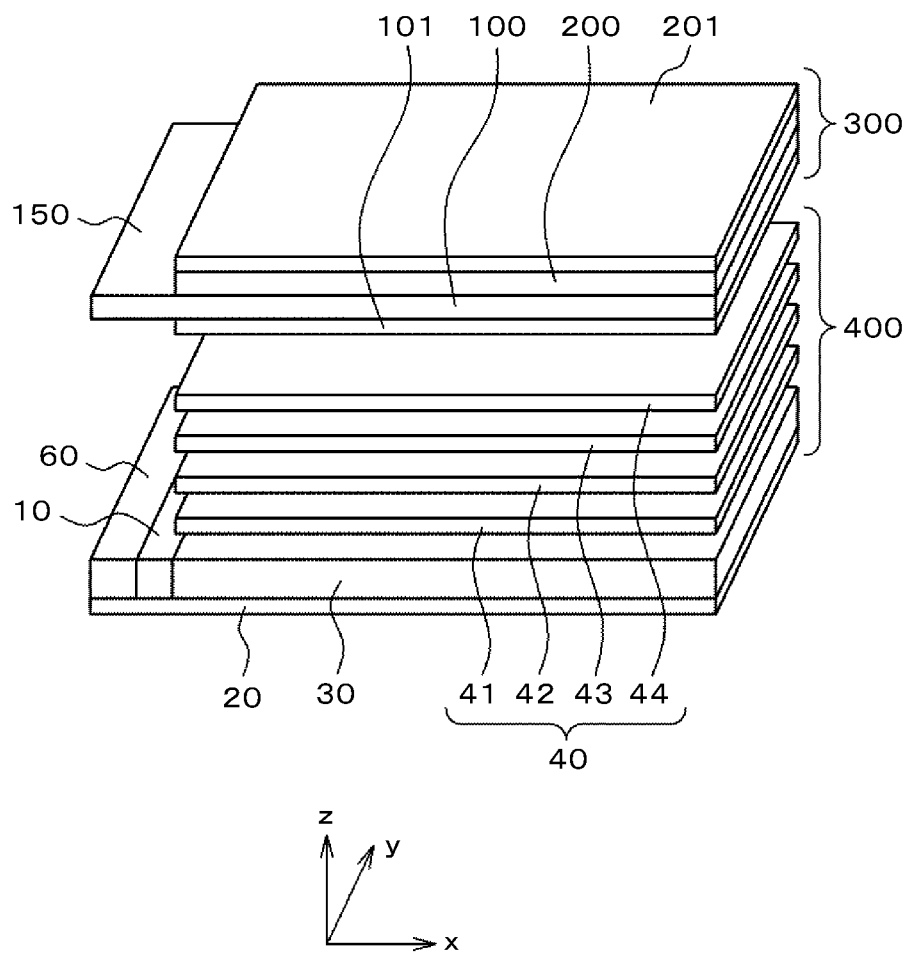
FIG. 1 is an exploded perspective view of a liquid crystal display device.

FIG. 1 is an exploded perspective view of a liquid crystal display device which includes a liquid crystal display panel 300 and a backlight 400. The liquid crystal display panel 300 is configured to interpose the liquid crystal between a TFT substrate 100 having the TFTs and pixels with pixel electrodes formed in a matrix, and a counter substrate 200. A lower polarization plate 101 is attached to the lower part of the TFT substrate 100, and an upper polarization plate 201 is attached to the upper part of the counter substrate 200. The backlight 400 is disposed on the back surface of the liquid crystal display panel 300.

The backlight 400 includes a light source having an LED 60 and a wavelength converter 10, a light guide plate 30, a reflection sheet 20 attached to the lower surface of the light guide plate 30, and an optical sheet group 40 disposed on the light guide plate 30. The light ray emitted from the LED 60 is made incidence on the wavelength converter 10 which uses the quantum dot. The light having the wavelength converted by the wavelength converter 10 is made incidence on the light guide plate 30.

The light incident on the light guide plate 30 is emitted from its major surface to the liquid crystal display panel 300. The light from the light guide plate 30, directed opposite to the liquid crystal display panel 300 is reflected by the reflection sheet 20 so as to be directed to the liquid crystal display panel 300. The reflection surface of the reflection sheet 20 is constituted by the dielectric multi-layer film, for example. The reflection sheet 20 has its thickness ranging from 40 μm to 100 μm. The optical sheet group 40 is disposed on the light guide plate 30. The optical sheet group 40 is constituted by a lower diffusion sheet 41, a lower prism sheet 42, an upper prism sheet 43, and an upper diffusion sheet 44, for example, from the light guide plate 30.

The light emitted from the light guide plate 30 mostly has luminance unevenness. The lower diffusion sheet 41 serves to make the light emitted from the light guide plate 30 uniform. The prism sheet has a microprism with a prism-like cross section extending in the predetermined direction. The pitch of the microprism may be set to 50 μm, for example. The prism sheet serves to direct the light which is about to proceed diagonally with respect to the major surface of the liquid crystal display panel toward the major surface thereof, thus improving the light utilization efficiency. The lower prism sheet 42 has the microprism extending along the x-direction as shown in FIG. 1, and the upper prism sheet 43 has the microprism extending along the y-direction as shown in FIG. 1.

The light emitted from the prism sheet has a repetitive pattern of the bright and dark parts in the microscopic view under the influence of the prism. Interference of such light with the scanning line or the video signal line on the liquid crystal display panel may generate the moire. The upper diffusion sheet 44 serves to prevent generation of the moire by diffusing the light emitted from the prism sheet.

FIG. 1 shows the optical sheet group 40 just for exemplifying purpose. The component to be used will be different depending on usage of the liquid crystal display device. There may be the case where the single prism sheet is only used, or the single diffusion sheet is only used. Alternatively, only the diffusion sheet is used by omitting the use of the prism sheet. Each of the respective optical sheets has the thickness of approximately 60 μm, for example.

Figure 2:
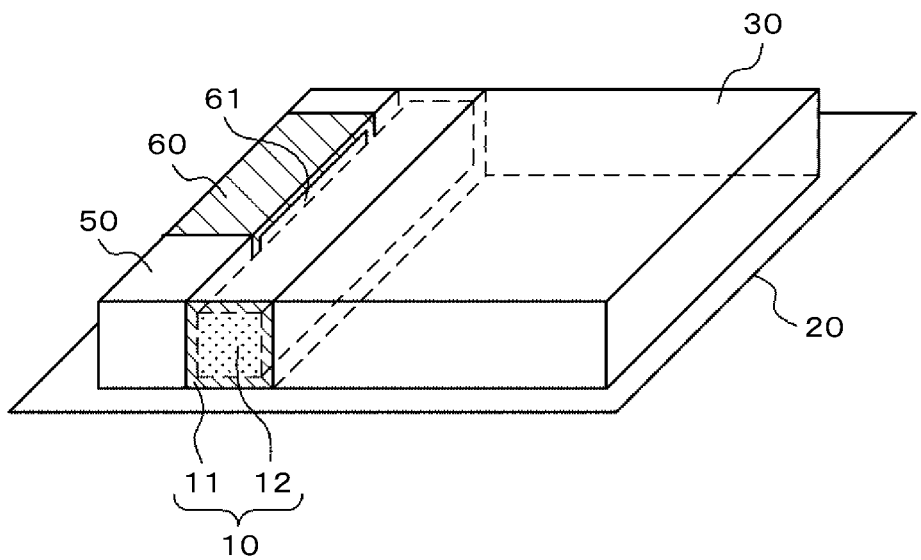
FIG. 2 is an exploded perspective view of a backlight.

FIG. 2 is a perspective view showing a part around the light source of the backlight according to the present invention. The backlight is disposed in a resin mold 50. Referring to FIG. 2, the LED 60 is disposed in the concave part of the mold 50. The wavelength converter 10 is arranged to face the LED 60. The wavelength converter 10 is configured by sealing the quantum dots 12 distributed in the resin and the like inside the supporter 11 constituted by a thin glass. The light guide plate 30 is disposed to face the wavelength converter 10.

Figure 3:
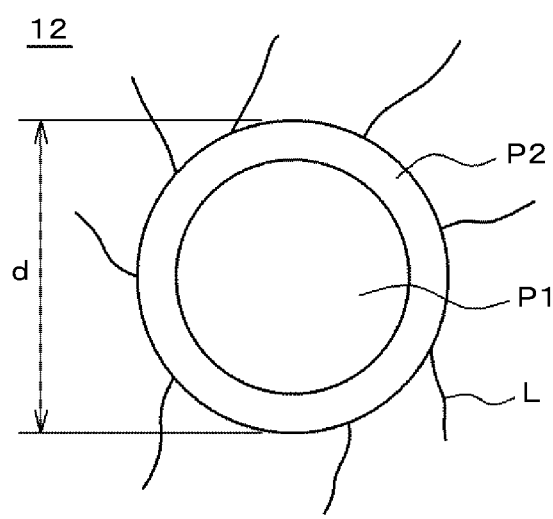
FIG. 3 is a schematic view of a semiconductor quantum dot.

The LED 60 emits blue light, and the backlight for the liquid crystal display panel requires white light. The blue light incident on the wavelength converter 10 is partially converted into the red light and the green light by the quantum dot 12. FIG. 3 is a schematic view of the quantum dot 12 used in the present invention. The quantum dot 12 is the semiconductor microparticle, making the wavelength of the converted and emitted light variable depending on the particle size. For example, if the particle size d is 2 nm, the green light will be emitted. If the particle size d is 8 nm, the red light will be emitted. Generally, the quantum dot size d is equal to or smaller than 20 nm.

Codes P1 and P2 shown in FIG. 3 denote semiconductors. For example, the P1 may be a spherical CdSe, circumference of which is covered with the P2 as ZnS. The quantum dot 12 seals the incident light so as to emit the light with longer wavelength than that of the incident light. The incident light emitted from the LED 60 is either the blue light or the UV light. The white light may be derived by changing the ratio of the quantum dots with different sizes depending on the case whether the incident light is the blue light or the UV light. The code L shown in FIG. 3 represents so-called Ligand which serves to facilitate dispersion of the quantum dots 12 in the resin.

Figure 4:
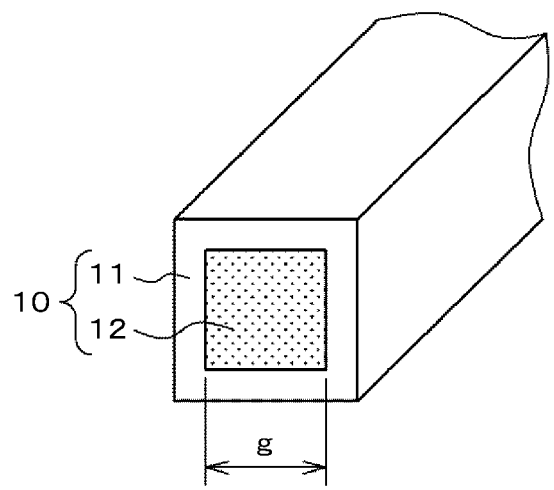
FIG. 4 is a perspective view of a wavelength converter.

FIG. 4 is a perspective view of the wavelength converter 10 configured by sealing the quantum dots 12 dispersed in the resin or the like within the supporter 11 as the glass. For example, Si resin, epoxy resin and the like may be employed as the resin. Referring to FIG. 4, the wavelength converter 10 has a square cross section. The cross section of the wavelength converter 10 has to be changed so as to be adapted to the shape of the liquid crystal display device or the backlight. The distance g across which the light passes through the wavelength converter 10 will be changed correspondingly in the range from 0.01 mm to 10 mm, for example. The quantity of light required to be converted may vary depending on the wavelength of the incident light. In other words, wavelength of the incident light and the distance g across which the light passes through the wavelength converter vary the ratio of the quantum dots with different diameters in the wavelength converter 10, or the quantum dot density.

Figure 5:
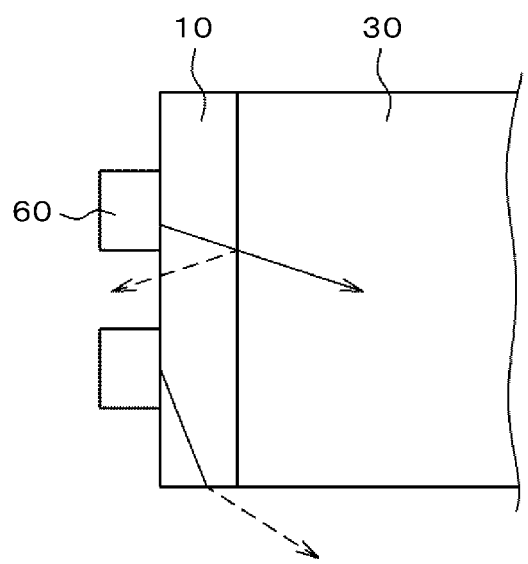
FIG. 5 represents an optical path in the case of no reflection film applied to the wavelength converter.

The supporter 11 employed for the wavelength converter 10 is not limited to the glass, but may be the transparent plastics such as acrylic and polycarbonate. In the case where the present invention is not applied, the light incident on the wavelength converter 10 is directed toward the light guide plate 30, but partially makes boundary reflectance on the supporter 11, and is radiated outside without being incident on the light guide plate 30 as shown in FIG. 5. Referring to FIG. 5, the light incident on the wavelength converter 10 from the LED 60 reflects on the boundary at the side of the light guide plate 30, which is then radiated outside owing to difference in the refractive index between the supporter 11 and air. Meanwhile, the light directed to the side surface of the wavelength converter 10 refracts, and is radiated outside. The resultant light leakage may deteriorate the light utilization efficiency of the backlight.

In the present invention, a reflection film 13 is formed on the surface of the wavelength converter 10 except the parts that face the LED 60 and the light guide plate 30 so as to guide the light incident on the wavelength converter 10 and the light having the wavelength converted by the quantum dots entirely into the light guide plate 30. In this way, the light utilization efficiency of the backlight may be improved.

Figure 6:
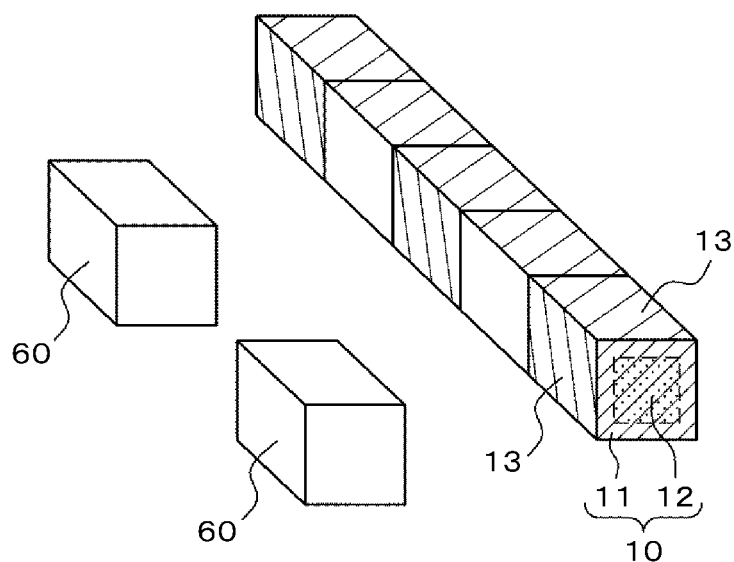
FIG. 6 is a perspective view of the wavelength converter according to a first embodiment when seen from an LED side.
Figure 7:
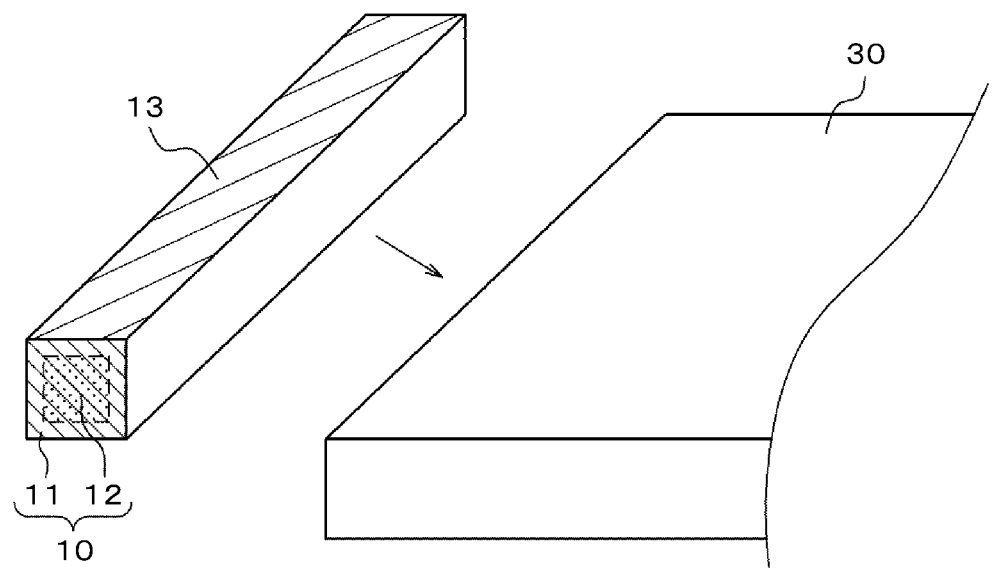
FIG. 7 is a perspective view of the wavelength converter according to the first embodiment when seen from a light guide plate side.

FIG. 6 is a perspective view of the wavelength converter 10 according to the present invention when seen from the LED 60. FIG. 7 is a perspective view of the wavelength converter 10 when seen from the light guide plate 30. Referring to FIG. 6, the reflection film is applied to the supporter of the wavelength converter 10 except the surfaces that directly face the LEDs 60. FIG. 6 only shows the upper side of the supporter 11. However, the reflection film is also applied to the lower side of the supporter 11. The reflection film 13 is applied to the side surface of the wavelength converter 10.

FIG. 7 is a perspective view of the wavelength converter 10 when seen from the light guide plate 30. The reflection film 13 is applied to the surface of the wavelength converter except the part that directly faces the light guide plate 30. Although not shown in FIG. 7, the reflection film is applied to the lower side of the wavelength converter 10. As FIGS. 6 and 7 show, the present invention is configured to allow all the incident light on the wavelength converter 10 to be made incidence on the light guide plate 30. This makes it possible to improve the light utilization efficiency of the backlight.

Figure 8:
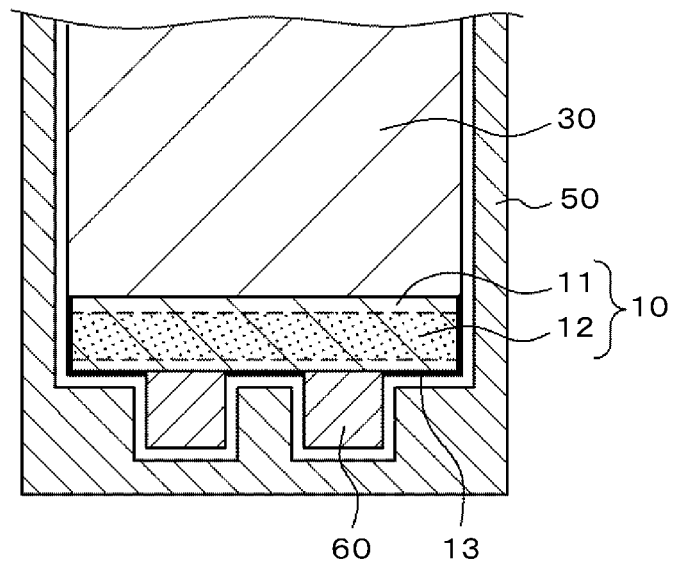
FIG. 8 is a plan view of the backlight according to the first embodiment.

FIG. 8 is a plan view representing the state where the LEDs 60, the wavelength converter 10, and the light guide plate 30 are stored in the mold 50. Referring to FIG. 8, the wavelength converter 10 is entirely covered with the reflection film 13 except the parts that directly face the LEDs 60, and the light guide plate 30. The hatching part and the side surface indicated by the bold line represent the part of the wavelength converter 10, to which the reflection film 13 is applied. Although not shown in FIG. 8, the reflection film is applied to the lower surface of the wavelength converter 10.

Figure 9:
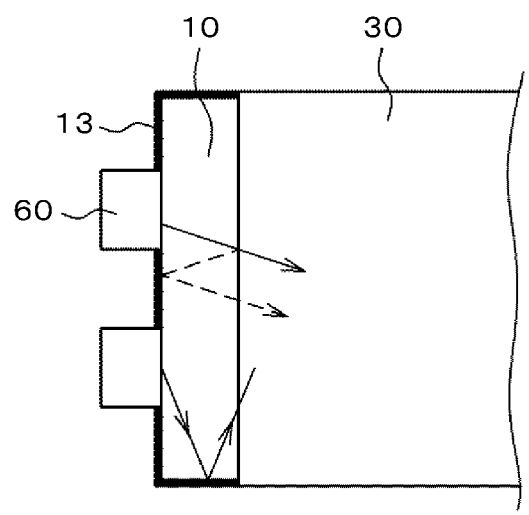
FIG. 9 represents an optical path in the case of using the wavelength converter according to the present invention.

FIG. 9 is a schematic view representing the optical path of the light emitted from the LED 60. The light which has been emitted from the LED 60, and partially reflecting on the part at which the wavelength converter 10 faces the light guide plate 30 will make reflection on the reflection film 13 applied to the wavelength converter 10 so as to be incident on the light guide plate 30. The light directed to the side surface of the wavelength converter 10 is reflected by the reflection film 13 so as to be incident on the light guide plate 30. Compared with the case where the reflection film is not applied to the wavelength converter 10 as shown in FIG. 5, the present invention allows significant improvement in the utilization efficiency of light emitted from the LED.

The reflection film 13 may be formed by sputtering or vapor depositing the metal film with high reflectance such as Al. Alternatively, the reflection film may be formed by applying the white resin with high reflectance, or the resin with metallic luster. It may also be formed by using the multi-layer film of the dielectric with different refractive indexes. The multi-layer film is formed by vapor deposition or sputtering. It is preferable to form the reflection surface into the mirror surface. In view of formation of the mirror surface, it is advantageous to use the glass for forming the supporter.

The method of manufacturing the wavelength converter 10 includes the step of forming the thin supporter. The quantum dot 12 dispersed in the liquid resin is injected into the supporter with vacuum injection method, which will be cured by heat or UV light. The thus formed quantum dot 12 having thin bar-like shape may be called "quantum dot bar".

Figure 10:
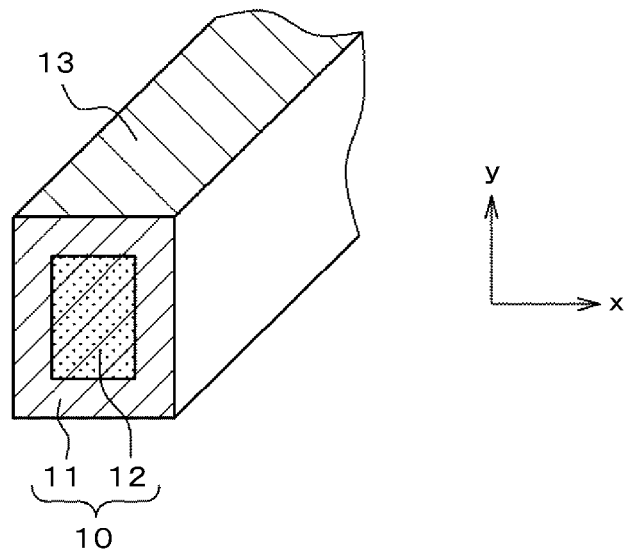
FIG. 10 shows another example of the wavelength converter according to the present invention.

FIG. 4 shows the wavelength converter 10 with square cross section as an example. However, the cross section may be arbitrarily shaped so as to be adapted to the shape of the liquid crystal display device. FIG. 10 shows the wavelength converter 10 with rectangular cross section, to which the reflection film 13 is applied except the side that faces the light guide plate. The cross section as shown in FIG. 10 has a longer side in the y-direction. It is also possible to allow the cross section to have the longer side in the x-direction as required by the liquid crystal display device. Likewise the case as described above, the reflection film is not applied to the surface that faces the light guide plate.

Figure 11:
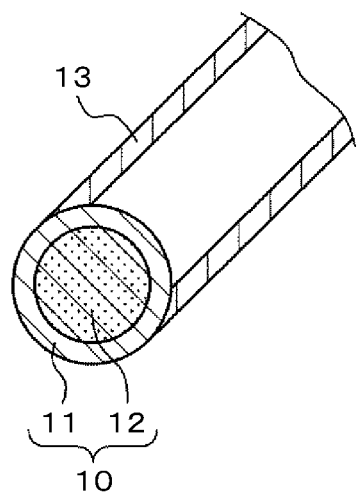
FIG. 11 shows still another example of the wavelength converter according to the present invention.
Figure 12:
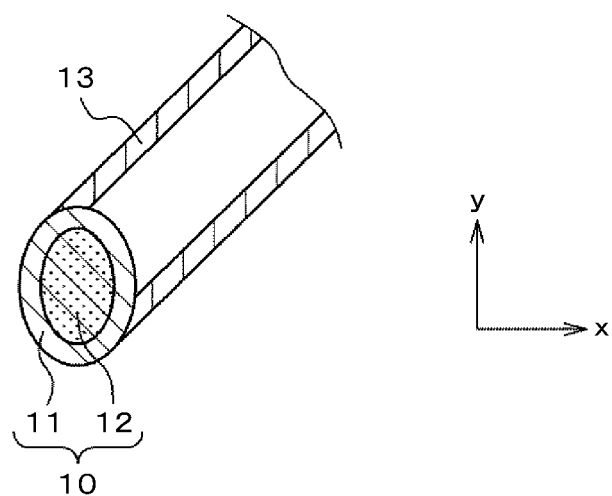
FIG. 12 shows yet another example of the wavelength converter according to the present invention.

FIG. 11 shows the wavelength converter with circular cross section. Referring to FIG. 11, the reflection film 13 is not applied to the side that faces the light guide plate. FIG. 12 shows the wavelength converter with oval cross section. Referring to FIG. 11, the reflection film 13 is not applied to the side that faces the light guide plate. FIG. 12 shows that the oval cross section has the long axis in the y-direction. However, it is also possible to form the oval cross section having the long axis in the x-direction so as to be adapted to the shape of the liquid crystal display device. In such a case, the reflection film 13 is not applied to the surface that faces the light guide plate as well. Referring to FIGS. 10 to 12, the reflection film is not applied to the surface of the wavelength converter, which directly faces the LED.

Second Embodiment

In the first embodiment, the reflection film is applied to the wavelength converter for improving the light utilization efficiency of the backlight. Such structure requires the process step of applying the reflection film to the wavelength converter. In this embodiment, the reflection sheet is partially used to form a reflector of the wavelength converter. The aforementioned structure may improve the light utilization efficiency of the backlight while omitting the process of applying the reflection film to the wavelength converter.

Figure 13:
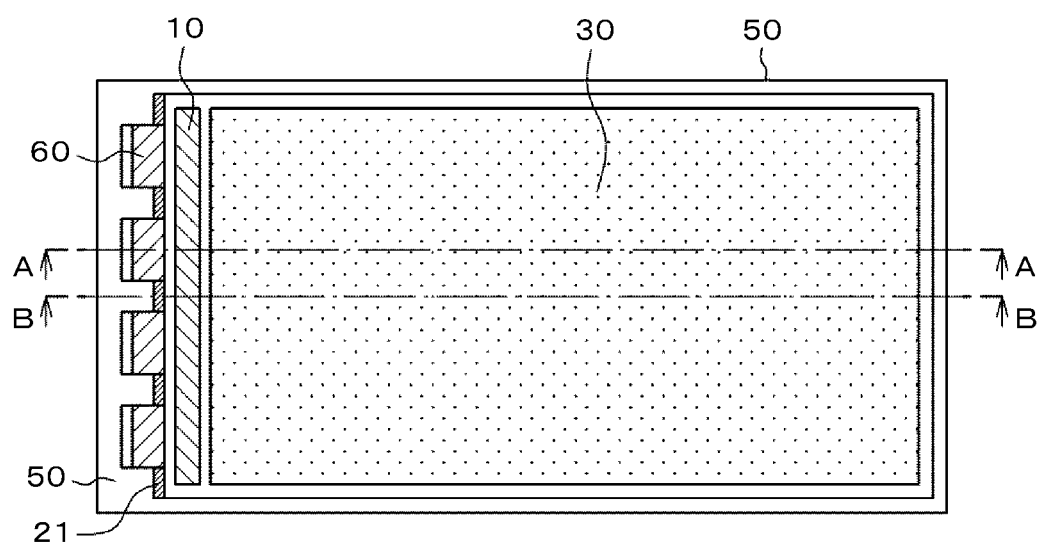
FIG. 13 is a plan view of the backlight according to a second embodiment.

FIG. 13 is a plan view of the backlight according to the embodiment. Referring to FIG. 13, the LEDs 60, the wavelength converter 10, and the light guide plate 30 are stored in the mold 50. The LED 60 is disposed in the concave part of the mold 50, and the wavelength converter 10 is disposed to face the LEDs 60. The light guide plate 30 is disposed to face the wavelength converter 10. As FIG. 13 shows, an erected part 21 of the reflection sheet 20 is disposed between the LEDs 60 while facing the wavelength converter 10. The erected part 21 of the reflection sheet 20 allows reflection of the light directed opposite to the light guide plate 30 so that the light is directed toward the light guide plate 30. This makes it possible to improve the light utilization efficiency of the backlight.

Figure 14:
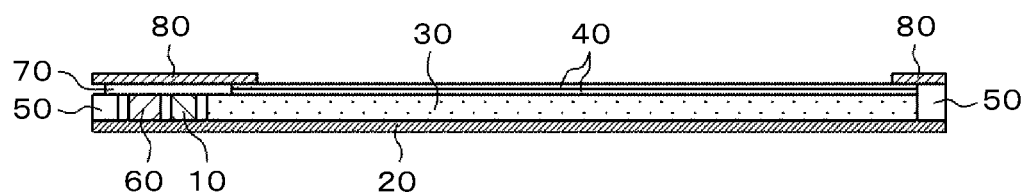
FIG. 14 is a sectional view taken along line A-A of FIG. 13.

FIG. 14 is a sectional view taken along line A-A of FIG. 13. Referring to FIG. 14, the wavelength converter 10 is disposed to face the LEDs 60, and the light guide plate 30 is disposed to face the wavelength converter 10. The reflection sheet 20 is applied to the lower side of the light guide plate 30. As FIG. 14 shows, the LED 60 is connected to a flexible wiring substrate 70, and the optical sheet group 40 including two sheets is applied to the upper side of the light guide plate 30. The use of two optical sheets for constituting the optical sheet group in this embodiment is a mere example. Four sheets may be used for constituting the optical sheet group as shown in FIG. 1. A light shielding tape 80 is applied to shield the LEDs 60 and the wavelength converter 10 as well as the peripheral area of the optical sheet group 40.

Figure 15:
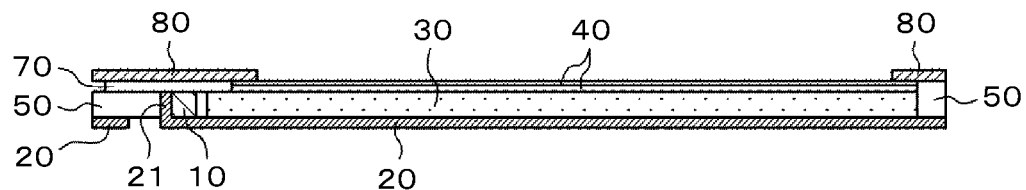
FIG. 15 is a sectional view taken along line B-B of FIG. 13.

FIG. 15 is a sectional view taken along line B-B of FIG. 13. FIG. 15 is different from FIG. 14 in the erected part 21 of the reflection sheet 20 for shielding the back surface of the wavelength converter 10. Referring to FIG. 15 as a sectional view of the part where the LED 60 does not exist, the incident light from the LED 60 is not shielded by the erected part 21 of the reflection sheet 20. Any other structures are similar to those described referring to FIG. 14.

As FIG. 15 shows, in this embodiment, the erected part of the reflection sheet 20 serves to return the light proceeding from the inside of the wavelength converter 10 in the direction opposite to the light guide plate 30 to the inside of the wavelength converter 10 again. This makes it possible to improve the light utilization efficiency of the backlight. The erected part 21 of the reflection sheet 20 may be formed simultaneously with shaping of the reflection sheet 20. It is therefore possible to reduce the load to the process compared with the case where the reflection film 13 is applied to the wavelength converter 10.

Figure 16:
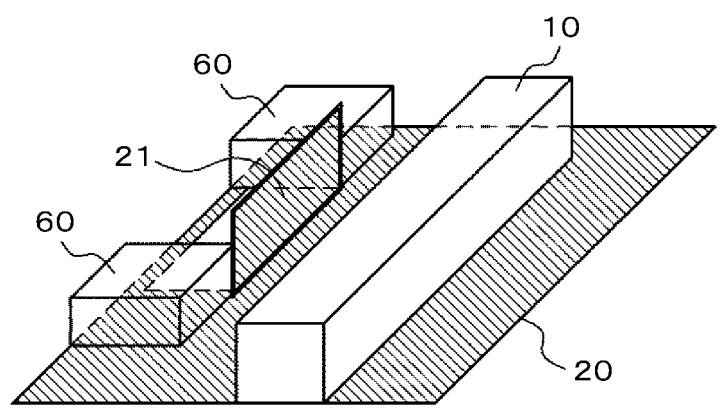
FIG. 16 is an exploded perspective view of an area around a light source according to the second embodiment.

FIG. 16 is a detailed exploded perspective view of the erected part of the reflection sheet 20. Referring to FIG. 16, the backlight with high light utilization efficiency may be configured only by disposing the LEDs 60 and the wavelength converter 10 on the reflection sheet 20 having the erected part 21.

Figure 17:
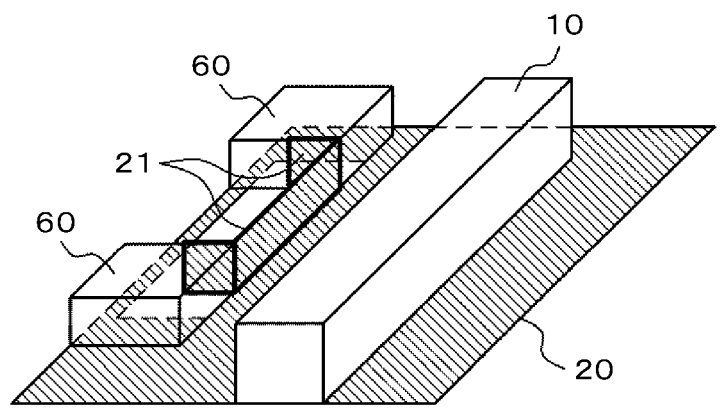
FIG. 17 is an exploded perspective view of an area around the light source, represented as another example of the second embodiment.

FIG. 17 is an exploded perspective view of another example of the backlight according to the embodiment. Referring to FIG. 17, the width of the erected part 21 of the reflection sheet 20 is increased so as to be partially bent to allow the reflection sheet to be disposed not only at the side that faces the wavelength converter 10 but also at the side surfaces of the LEDs 60 at least partially. The LED 60 may cause the light leakage from the lateral side rather than from the lower surface. In such a case, the reflection sheet is applied to the side surface of the LED to prevent the light leakage therefrom so as to ensure improved light utilization efficiency of the backlight.

Figure 18:
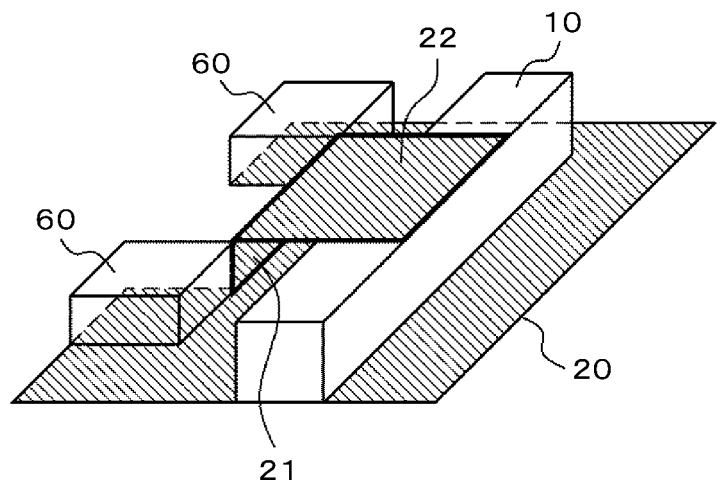
FIG. 18 is an exploded perspective view of an area around the light source, represented as still another example of the second embodiment.

FIG. 18 is an exploded perspective view of another example of the backlight according to the present invention. Referring to FIG. 18, the length of the erected part 21 of the reflection sheet 20 is made longer compared with the case as shown in FIG. 16. A folded part 22 of the reflection sheet 20 covers not only a part of the side surface but also the upper surface of the wavelength converter 10 at least partially. The configuration as shown in FIG. 18 reflects the light proceeding from the upper surface of the wavelength converter 10 to the outside to be returned to the inside thereof, thus further improving the light utilization efficiency of the backlight compared with the case as shown in FIG. 16.

The explanation has been made with respect to application of the present invention to the backlight of the liquid crystal display device. However, the present invention may be applied to any other display device requiring the backlight with no limitation.

What is claimed is:

1. A backlight used for a display device, wherein:
the backlight includes a light guide plate, an LED, and a wavelength converter between the light guide plate and the LED, and a reflection sheet is applied to lower sides of the light guide plate and the wavelength converter,
the wavelength converter includes a semiconductor quantum dot in a supporter,
the wavelength converter has a first side surface and a second side surface, the second side surface faces the light guide plate,
the first side surface opposes to the second side surface,
the LED faces to the first side surface,
the reflection sheet has an erected part, and
the erected part covers a part of the first surface that does not face the LED.

2. The backlight according to claim 1, wherein the erected part of the reflection sheet further covers at least a part of a side surface of the LED.

3. The backlight according to claim 1, wherein the erected part of the reflection sheet further covers at least a part of an upper surface of the wavelength converter.

4. The backlight according to claim 1, wherein the backlight forms a liquid crystal display device together with a liquid crystal display panel.

5. The backlight according to claim 2, wherein the backlight forms a liquid crystal display device together with a liquid crystal display panel.

6. The backlight according to claim 3, wherein the backlight forms a liquid crystal display device together with a liquid crystal display panel.

7. A liquid crystal display device comprising:
a liquid crystal display panel; and
a backlight, wherein
the backlight includes a light guide plate, an LED, and a wavelength converter between the light guide plate and the LED, and a reflection sheet is applied to lower sides of the light guide plate and the wavelength converter,
the wavelength converter includes a semiconductor quantum dot in a supporter, and
the wavelength converter has a first side surface and second side surface, the second side surface faces the light guide plate,
the first side surface opposes to the second side surface,
the LED faces to the first side surface,
the reflection sheet has an erected part, and
the erected part covers a part of the first surface that does not face the LED.

8. The liquid crystal display device according to claim 7, wherein the reflection film is a metal film.

9. The liquid crystal display device according to claim 7, wherein the reflection film is made of a resin material.

10. The liquid crystal display device according to claim 7, wherein the reflection film is formed as laminated films each with different refractive index.

* * * * *